United States Patent [19]
Sheets

[11] Patent Number: 5,691,998
[45] Date of Patent: Nov. 25, 1997

[54] DATA TRANSMISSION PROTECTION CIRCUIT WITH ERROR CORRECTION

[75] Inventor: Laurence L. Sheets, St. Charles, Ill.

[73] Assignee: Teltrend Inc., St. Charles, Ill.

[21] Appl. No.: 438,631

[22] Filed: May 10, 1995

[51] Int. Cl.$^6$ ................................................ G06F 11/00
[52] U.S. Cl. ............................ 371/57.1; 371/60; 371/65; 371/20.1; 375/343
[58] Field of Search .................... 371/20.2, 20.1, 371/57.1, 57.2, 55, 60, 48, 30; 370/16, 17; 375/343, 292; 341/126, 127, 50, 52, 70; 379/2, 12, 26

[56] References Cited

U.S. PATENT DOCUMENTS

| | | | |
|---|---|---|---|
| 4,276,649 | 6/1981 | Groenendaal et al. | 371/55 |
| 4,408,325 | 10/1983 | Grover | 370/119 |
| 4,464,765 | 8/1984 | Shimizu | 375/292 |
| 5,285,459 | 2/1994 | Okuyama et al. | 371/57.1 |

*Primary Examiner*—Phung Chung
*Attorney, Agent, or Firm*—McDonnell Boehnen Hulberts & Berghoff

[57] ABSTRACT

A protect circuit that may be interconnected to two different data transmission lines and that provides enhanced error correction. The circuit includes first and second line build-out circuits and fixed delay buffers interconnected to the two transmission lines, as well as a controller and switch. The build-out circuits allow the data bits received from the two data transmission lines to be correlated. Each of the fixed delay buffers has a predetermined length and holds a sequence from one of the two transmission lines. The controller tests the correlated data bits from the build-out circuits to determine whether any coding rule violation has occurred. If a coding error, such as, for example, a hi-polar violation, is detected, the contents of the fixed delay buffer that includes the bit that does follow the predetermined coding rule is transmitted to the receiving station. Thus, both of the transmission lines are utilized in order to enhance the accuracy of the data transmitted to the receiving station.

26 Claims, 5 Drawing Sheets

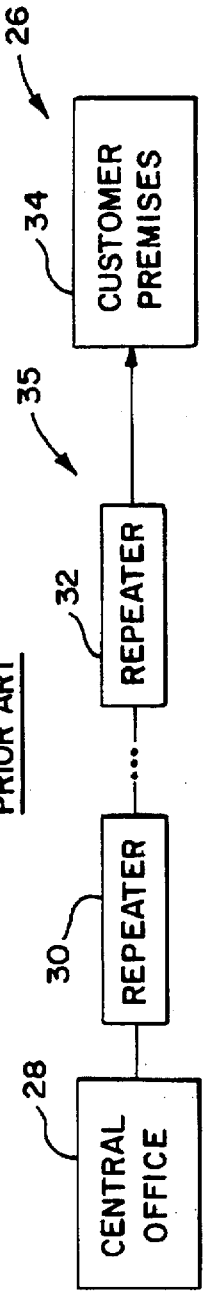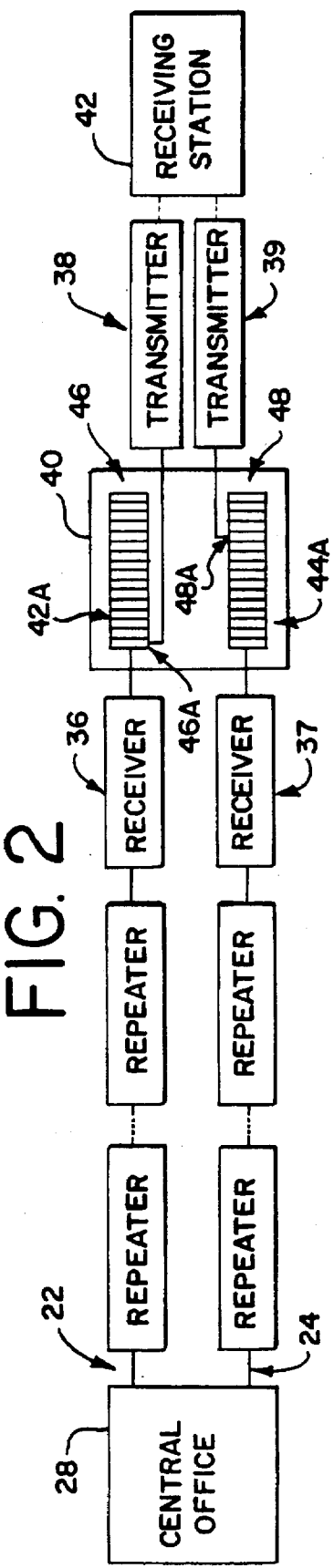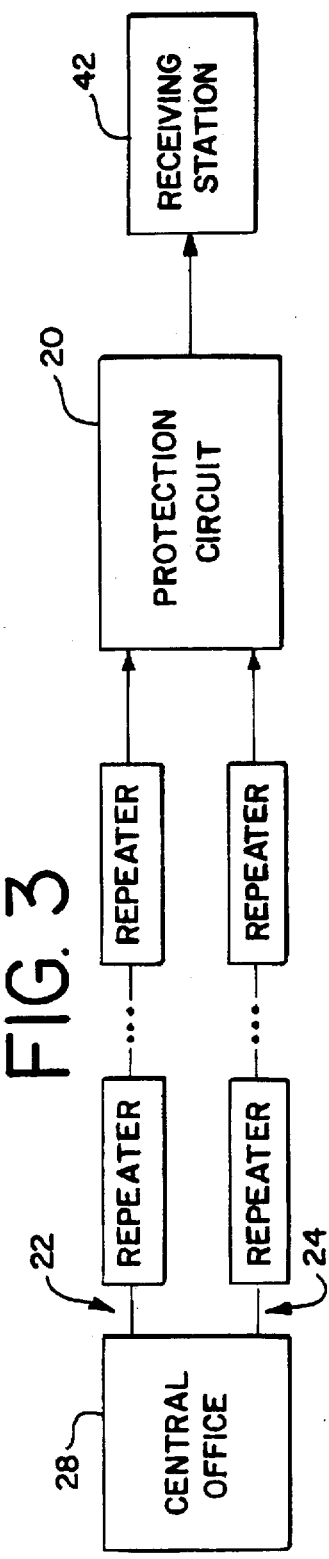

DATA TRANSMISSION PROTECTION CIRCUIT WITH ERROR CORRECTION

BACKGROUND OF THE INVENTION

The present invention relates generally to data transmission systems and, more particularly, to a data transmission protection circuit that includes an error correction feature to further ensure the accuracy of the data received at a remote location. The present invention may be used with digital transmission lines generally, including, for example, the Bell Telephone System in the United States. The data, or "payload," signals on such transmission lines are typically sent differentially on a Tip-Ring pair. Payload signals are received by the telephone company central office and, generally, transmitted, via cables, to a series of regenerative signal repeaters.

The Bell Telephone System has widely utilized time-multiplexed pulse code modulation systems. Such systems have generally been designated as "T carriers." The first generation of multiplexers designed to feed a T1 system was the D1 channel bank. Channel banks have evolved through the D5 series. The "D" channel bank provides multiple DS-1 signals that are carried on the T1 system. Each T1 system carries twenty-four, two-way channels on two pairs of exchange grade cables. One pair of cables provides communication in each direction.

Other standards have also been developed for the transmission of digital data using other media, including, for example, fiber optic cables and satellites. Hereafter, all such media for the transmission of digital data may be considered types of transmission lines.

A coding system, or series of coding rules, is generally followed when transferring digital data from a source onto the transmission lines. The system guarantees some desired properties of the transmitted signal, regardless of the pattern of the data to be transmitted. A prevalent code in the United States is bi-polar coding with an all-zero limitation, which also may be called "AMI" or "Alternate Mark Inversion."

With bi-polar coding, alternate "ones" are transmitted as alternating positive and negative pulses, assuring a direct current balance and avoiding base-line wander. With an all-zero limitation, a maximum of fifteen "zeros" between "ones" is required. Other forms of line encoding may be also may be employed, such as, for example, B3ZS.

Signals that violate the rules established by a particular coding scheme are in error. Thus, for example, under a bi-polar coding system, two positive pulses, or bits, should never occur in sequence. To the extent such bits do occur, without an intermediate negative bit, the second positive bit is detected as a bi-polar violation and is indicative of an error in transmission. The bit-error ratio (or "BER") may be defined as the number of bits received in error divided by the total number of bits transmitted during a specified time interval. Within a specified interval, the BER is numerically equal to the bit error probability.

Some instances of errors are acceptable. For example, for speech communication, a listener is often tolerant of a low level of background noise caused by randomly distributed errors. A low but constant rate of errors is generally less objectionable for voice transmissions than, for example, a period of no errors followed by a burst of many errors. For example, CCITT Recommendation G.821, Error Performance of an International Digital Connection Forming Part of an Integrated Services Digital Network (1988) sets forth exemplary objectives of fewer than 8% of one-second intervals having an error and fewer than 0.2% of one-second intervals having a BER worse than $10^{-3}$ (1 error in 1000). In some environments, a BER of more than one in $10^6$ bits is a cause for alarm, and a BER greater than one in $10^3$ bits is deemed a severe error rate and is cause for significant concern.

Some telecommunications customers require uninterrupted data transmission service with an acceptable BER: Any substantial break in the transmission service or substantial period of a high BER is unacceptable. Accordingly, such customers may use two transmission lines in parallel to relay the same data to a particular receiving station. As long as one of the transmission lines continues to provide an acceptable quality of service, the other, or "backup," transmission line remains substantially unused.

SUMMARY OF THE INVENTION

In a principal aspect, the present invention relates to the digital transmission of data over telecommunication lines and, more particularly, to a system that interconnects at least two digital transmission lines to a receiving station. Each of the transmission lines transmits the same series of data bits. The data bits follow a predetermined coding rule.

Conceptually, the preferred embodiment of the system includes a line receiver, build-out circuit, and delay circuit interconnected to the transmission lines, as well as a controller and switch. The line receiver accepts a signal from the transmission lines and delivers a corresponding signal to the build-out circuit. The build-out circuit provides a delay for the signals from the transmission lines, such that the data bits from the lines may be correlated. That is, the electrically shortest line is "built out" to equal the longest line. The delay circuit has a finite length and holds sequences from the output of the delay circuit. The controller tests the correlated data bits from the build-out circuit to determine whether any coding rule violation has occurred. If a predetermined coding rule is violated by one of the correlated bits, the controller activates the switch so that the sequence of bits from the transmission line without the detected violation of a coding rule transmits data to the receiving station.

Thus, an object of the present invention is an improved data transmission protection circuit that has an improved error correction capability. A further object is an improved transmission protection circuit, interconnected to at least two transmission lines, that better utilizes both lines, in order to provide a more error-free stream of data to a receiving station. These and other objects, features, and advantages of the present invention are discussed or apparent in the following detailed description.

BRIEF DESCRIPTION OF THE DRAWING

A preferred embodiment of the present invention is described herein with reference to the drawing wherein:

FIG. 1 is a block diagram showing a digital telecommunications transmission line that may be employed with the present invention;

FIG. 2 is a simplified block diagram of an embodiment of the present invention, including two transmission lines in a tandem configuration between a central office and a receiving station.

FIG. 3 is a block diagram of an embodiment of the present invention interconnected to two transmission lines, such as the line shown in FIG. 1;

DETAILED DESCRIPTION OF THE PREFERRED EMBODIMENTS

Figure 4:
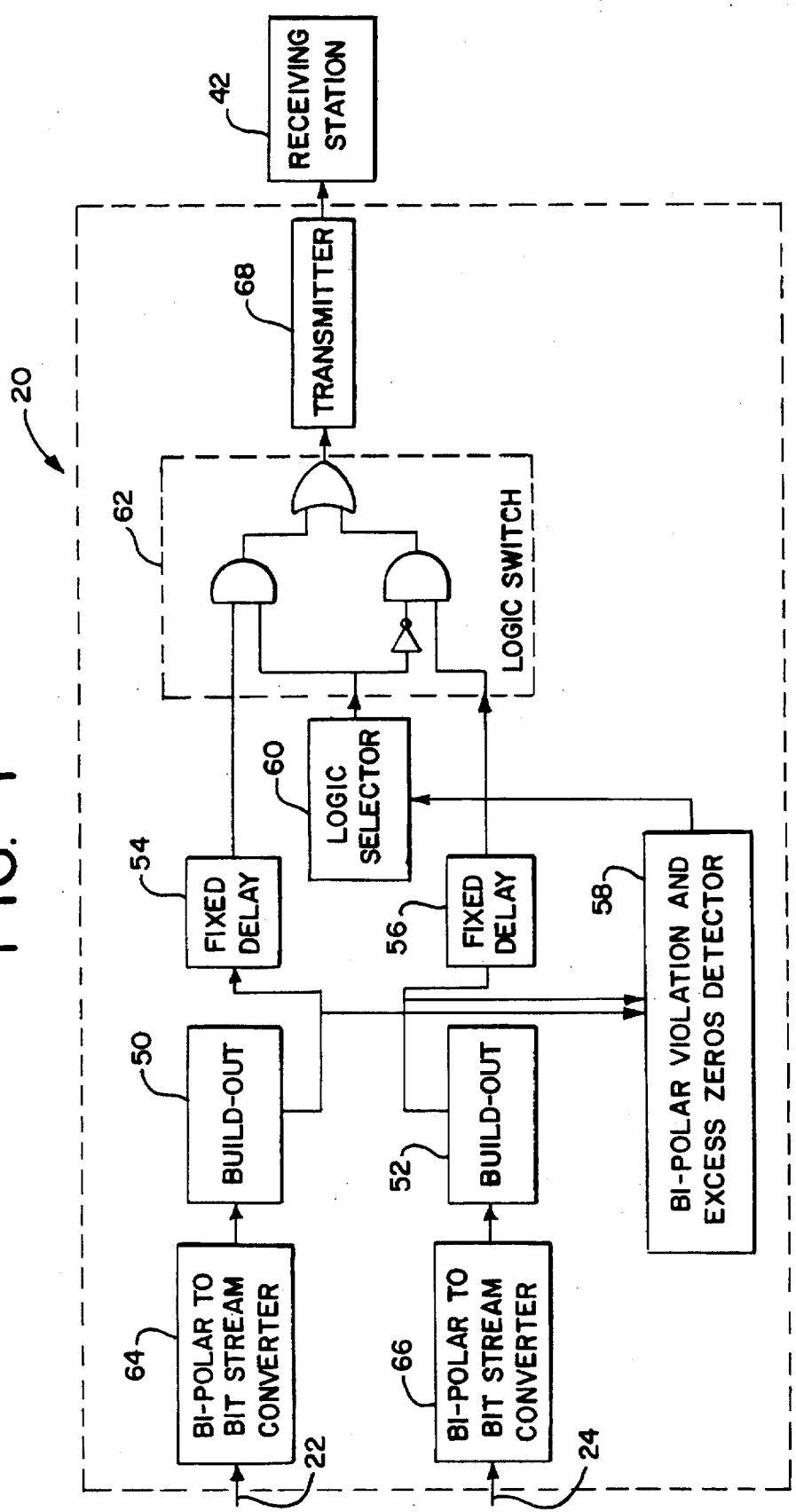
FIG. 4 is a detailed block diagram of an embodiment of the invention shown in FIG. 3.

Referring to FIGS. 2–7, a preferred embodiment of the present invention is shown as a data transmission protection circuit 20 interconnected to first and second digital transmission lines 22, 24. As shown in FIG. 1, an exemplary prior art digital transmission facility 26 includes a central office 28, a series a regenerative repeaters (exemplary repeaters 30, 32 are shown), and customer premises 34. The central office 28 transmits a digital signal, via the transmission line 22, to the repeater 30. For purposes of illustration, the described transmission line 22 includes a series of metal cables, although other forms of transmission media may also be readily used with the present invention.

The repeater 30 receives data from the central office 28 but, because of transmission line losses, noise, interference, and distortion, the signal will have degenerated. The repeater 30 recognizes the presence or absence of a pulse at a particular point in time, and thereafter, if appropriate, regenerates, or builds up, a clean, new pulse. The first repeater may send the regenerated, or repeated, signal to the next line repeater stationed approximately 6,000 feet away.

In FIGS. 1–5 and 7, the digital data from the central office 28 is shown as going to the customer premises 34 or another such receiving station. Of course, the present invention may be utilized with data moving in the opposite direction. For purposes of illustration only, it is assumed that the customer premises 34 or other receiving station may utilize data in the format provided on the transmission lines. If this is not the case, of course, a remote terminal or other translation facility may be installed between the last repeater 32 and customer premises 34 or other receiving station in order to provide data in another format.

For some customers, uninterrupted service is essential. In such cases, the first and second transmission lines 22, 24 may be connected to first and second line receivers 36, 37, first and second transmitters 38, 39, and a delay interface 40 between the line receivers and transmitters. The line receivers 36, 37 condition input signals on the lines 22, 24 for use by the interface 40. See FIG. 2. The interface 40 provides two data streams for the customer premises or other receiving station 42 that is intended to utilize the transmitted data. The two transmitters 38, 39 accept the output of the interface 40 and send the output, in the required format, to the receiving station 42. While only two lines 22, 24 are shown, more than two lines could, of course, also be utilized for uninterrupted service.

A particular pulse sent by the central office 28 along the two different lines 22, 24 may not be received by the receiving station 42 at exactly the same point in time. That is, the pulses may be not be phase synchronized with respect to each other. The lines 22, 24 may have different lengths or may be different media, such as where one line is a metal cable while the other line is a fiber optic cable or satellite transmission facility.

Even if the first and second transmission lines 22, 24 are both T1 metal cables, other influences, such as diurnal effects, may also cause timing variations. Diurnal variations, sometimes also referred to as "breathing," may result when one of the transmission lines 22, 24 has a path that is physically warmer than the other. Consequently, signals traveling through the one line may take longer to reach the receiving station 42.

The interface 40 shown in FIG. 2 helps phase synchronize digital data transmitted by the first and second transmission lines 22, 24. The interface 40 may include, for example, first and second shift registers 42A, 44A. Each of the shift registers 42A, 44A includes a series, or sequence, of cells 46, 48 (such as cell 46A, 48A), which sequentially receive data from the transmission lines 22, 24 Each of the shift registers 42A, 44A may also include a series of taps (not shown) where each tap is uniquely associated with one of the cells 46, 48.

Thus, for example, by comparing the contents of the two shift registers 42A, 44A, the contents of the first cell of the first shift register 42A (which receives data from the first transmission line 22) may be determined to correlate to the contents of the fourth cell of the second shift register 44A (which receives data from the second transmission line 24). The bits from these two cells are then transmitted at the same time to the receiving station 42A. See FIGS. 2 and 6.

The receiving station 42 may continue to rely on, for example, the first shift register 42A and the first line 22 for data until the first line 22 becomes disabled. Upon such an occurrence, the receiving station 42A may come to rely on the second shift register 44A and second transmission line 24 for additional data. Much of the time with such a configuration, however, one line is used to provide data to the receiving station 42 while the other line is unused.

A conceptual block diagram of an embodiment of the present invention is shown in FIG. 3. The protection circuit 20 similarly uses the two transmission lines 22, 24 emanating from the central office 28. As with the interface 40, the protection circuit 20 correlates the data arriving on each of the lines 22, 24. Unlike the interface 40, however, in the protection circuit 20, the data on each of the lines 22, 24 are monitored simultaneously to substantially decrease the risk that incorrect data are transmitted to the receiving station 42.

As shown in the conceptual block diagram of FIG. 4, the protection circuit 20 of the preferred embodiment includes first and second line build-out circuits 50, 52, first and second buffers or fused delay circuits 54, 56, a hi-polar violation and excess zeros detector 58, logic selector 60, and logic switch 62. In one embodiment, the build-out circuits 50, 52 are comprised shift registers, which are interconnected to the first and second transmission lines 22, 24. The delay circuits 54, 56 shown are similarly comprised of two shift registers.

Figure 5:
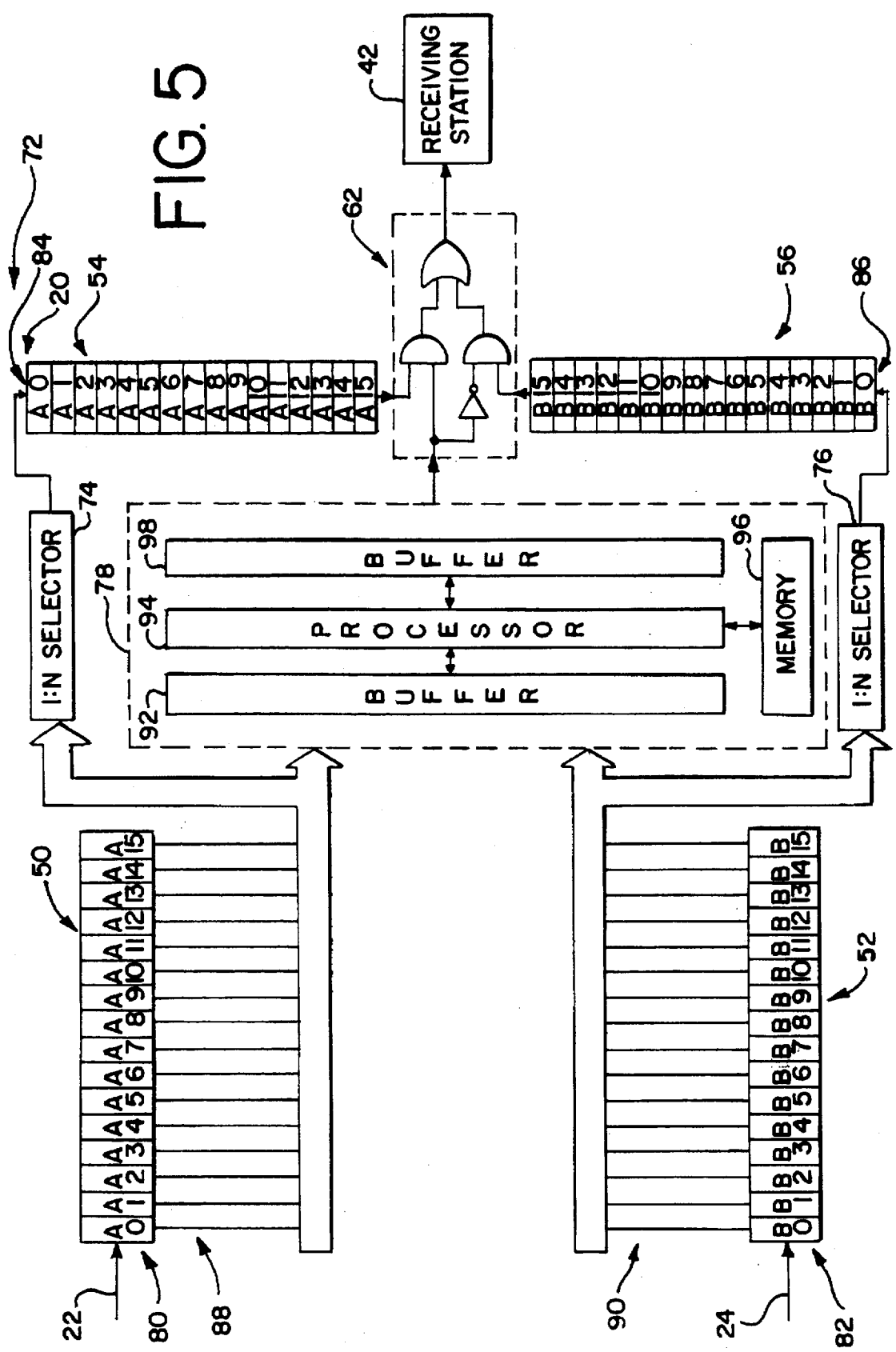
FIG. 5 is a more detailed block diagram of an embodiment of the invention shown in FIG. 3.

In the conceptual configuration shown in FIGS. 4 and 5 for purposes of illustration, the switch 62 is a logic switch comprised of an inverter, two AND gates, and an OR gate. Accordingly, the signal on a single lead from the logic selector 60 dictates whether the output of the first or second delay circuit 54, 56 is sent to the receiving station 42.

In a more practical implementation (such as that shown in FIG. 7 and described later herein), the hi-polar signal may be decoded to two bits per symbol. These two bits convey the logic level of the signal (0 or 1), as well as the sense, or sign, of the hi-polar signal. The build-out circuits 50, 52 would each delay two bit streams, not one. The same is true of the fixed delay circuits 54, 56, while the switch 62 would have to switch two bit streams. Thus, bi-polar violations that are intentionally inserted in the stream (with, for example, a B82ZS coding system) would be passed on to the receiving station 42. See FIG. 7.

The protection circuit 20 shown in FIG. 4 also includes first and second bi-polar to bit stream (2-bit) converters 64, 66, as well as a transmitter 68. For purposes of illustration, in the conceptual configuration shown in FIG. 4, each of the converters 64, 66 are able to convert the signals on one of the incoming lines 22, 24 to a 2-bit (0 or 1) data stream for use by the remainder of the protection circuit 20. The transmitter 68 accepts the output of the switch 62, converts the output, if necessary, to a format acceptable to the receiving station 42, and sends the result to the receiving station 42. For purposes of illustration with respect to the embodiment shown in FIG. 5, it is assumed that the data on transmission lines 22, 24 includes only, for example, one bit per symbol (0 or 1).

Figure 7:
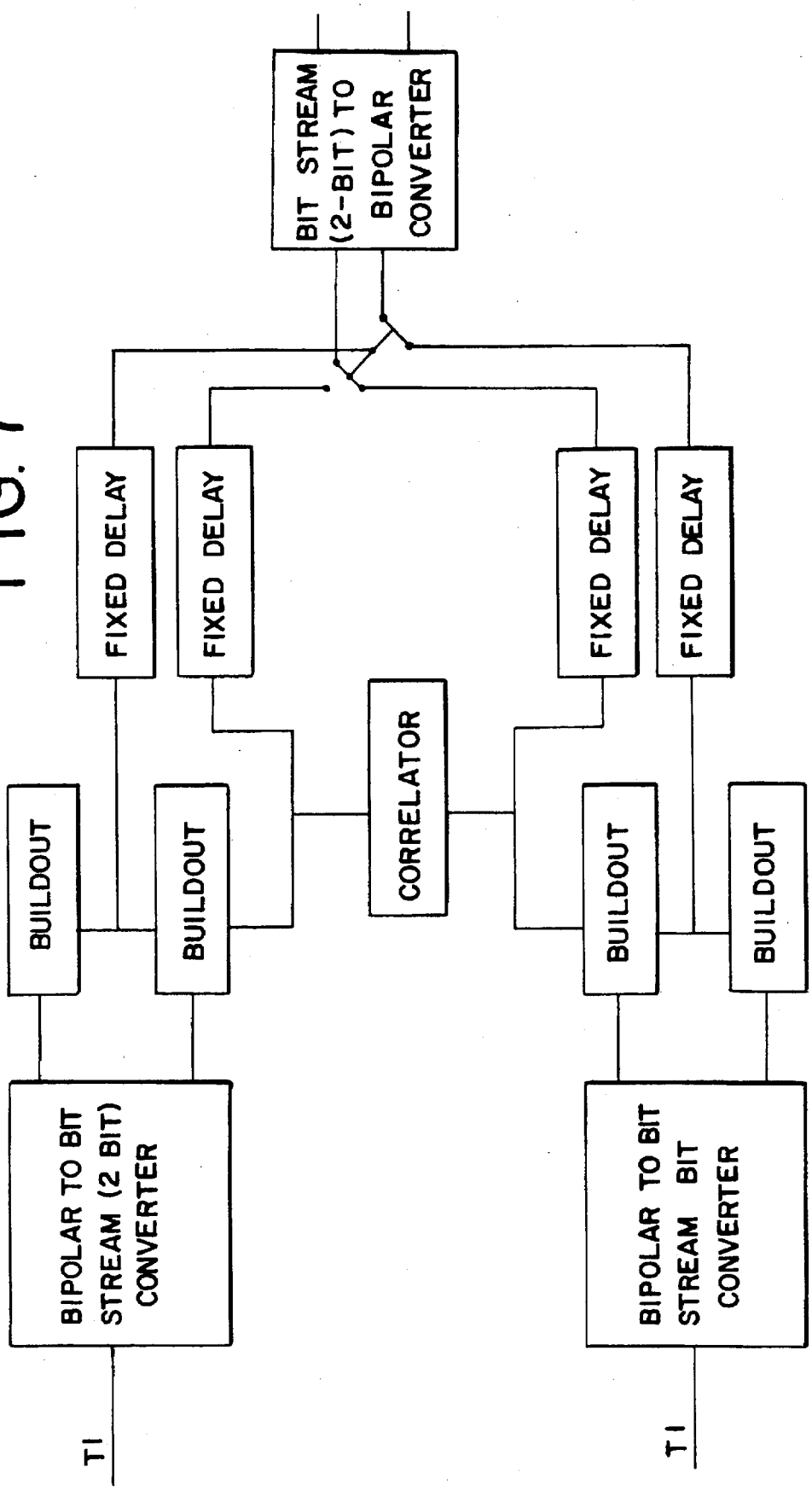
FIG. 7 is a more detailed block diagram of an embodiment of the invention shown in FIG. 3, wherein two T1 transmission lines are each interconnected to a bi-polar to bit stream converter.

Notably, in the embodiment shown in FIGS. 4, 5, and 7, the data received over the transmission lines 22, 24 need not necessarily be framed signals. In the embodiment chosen for purposes of illustration, the data from the transmission lines 22, 24 generally follow alternate mark inversion line coding with an all zero limitation. Thus, ones are transmitted as alternating positive and negative pulses. Also, a maximum of fifteen zeros between non-zero pulses is required. Accordingly, in the preferred embodiments shown, each of the buffers 54, 56 has at least sixteen cells.

Referring now again to FIG. 4, if sixteen sequential "zeros" occur, or if the polarity of the non-zero pulses does not vary properly, the detector 58 will instruct the logic selector 60 which of the lines 22, 24 includes the error. If, for example, a coding error is detected with a particular bit on the first transmission line 22, and the correlated data bit on the second transmission line 24 does not violate the coding rule, the detector 58 effectively "knows" that an error has occurred and on which line it occurred. The detector 58 will advise the logic selector 60 which, in turn, promptly ensures that the logic switch 62 transfers the data from second transmission line 24 (and not the first transmission line 22) to the receiving station 42.

Moreover, the coding error is likely to be held in the first delay circuit 54 (and not yet transmitted to the receiving station 42) when the switch 62 changes state. As a result, it is likely that error-free data are sent to the receiving station 42, even when an error occurs on one of the transmission lines 22, 24.

In the circumstances just described, the detector 58 will generally maintain the switch 62 such that data from the second delay circuit 56 are transmitted to the receiving station 42. This condition will continue until a coding violation is found in the data from the second line 24. When this occurs, if the corresponding bit from the first build-out circuit 50 is not also a coding error, the detector 58 and selector 60 will then activate the switch 62 so that data from the first delay circuit 54 are transmitted to the receiving station 42.

An error sensed by the detector 58 may lie with the very bit on the transmission line that was noted to be a coding violation, or the error may have occurred earlier. For randomly generated data, upon noting a bi-polar violation, the probability that the error did not occur within the last "N" bits is approximately proportional to one in $2^{N+1}$, for N>0. Thus, the probability is substantial that the error occurred no earlier than the previous eight or sixteen bits.

Thus, as referred to above, if the fixed delay circuits 54, 56 have sixteen cells (or even fewer), the probability is good that, when a coding violation is detected by the detector 58, the incorrect bit is within one of the delay circuits 54, 56. Consequently, if the detector 58 and selector 60 promptly change the state of the switch 62 upon detecting a coding error, the risk is small that data with a coding error will be transmitted to the receiving station 42.

Referring now to the more detailed conceptual diagram of FIG. 5, the protection circuit 20 is shown as including the build-out circuits 50, 52, buffers or fixed delay circuits 54, 56, and logic switch 62, as well as a controller 72. The controller 72 includes first and second 1:N selectors 74, 76, and a computational module 78.

The first and second fixed delay circuits 54, 56 each sequentially store a finite number of bits from, respectively, the first and second transmission lines 22, 24. The build-out circuits 50, 52 and fixed delay circuits 54, 56 are each comprised of 16-cell shift registers 80, 82, 84, 86. The build-out circuits 50, 52 each also include a series of taps 88, 90 that provide data on the contents of the cells of the shift registers 80, 82 to the controller 72.

The 1:N selectors 74, 76 correlate the bits of data between the two shift registers 80, 82. The module 78 performs the functions of the bi-polar violation and excess zeros detector 58 and logic selector 60 shown in FIG. 4. Thus, the module 78 compares the correlated bits to determine whether the bits are violating or following the appropriate coding rule.

A particular bit in a cell of the first shift register 80 may be correlated with a selected bit in a cell of the second shift register 82. In the example shown FIG. 6, the bit in the first cell of the first build-out circuit 50 correlates to the bit in the fourth cell of the second build-out circuit 52. These two bits may thus be considered "correlated bits."

The module 78 includes an input buffer 92, processor 94, associated memory 96, and output buffer 98. The input buffer 92 accepts information regarding the contents of the build-out circuits 50, 52 and provides such information, in a coded format, to the processor 94. The processor 94 activates the switch 62 via the output buffer 98.

Thus, in the embodiment shown, the controller 72 determines whether either of the buildout circuits 50, 52 include a coding error. The controller 72 responsively activates the switch 62 so that data from the first line 22 (and first buffer 50) or from the second line 24 (and second buffer 52) are forwarded to the receiving station 42, depending on which of the lines 22, 24 last had a coding error.

The process of testing for a correlation between bits may be conducted by comparing $A_n$ with $B_m$ for 1<n, m<16, where A and B represent, respectively, the bit content of the first and second build-out circuits 50, 52, and n and m represent, respectively, cell numbers of the first and second build-out circuits 50, 52. The processor 94 may, for example, attempt to correlate $A_0$ with $B_x$ such that $A_0=B_x$ (for x=1, 2, 3 . . . ) or, if this is not successful, correlate $B_0$ with $A_x$ such that $B_0=A_x$ (for x=1, 2, 3 . . . ).

Figure 6:
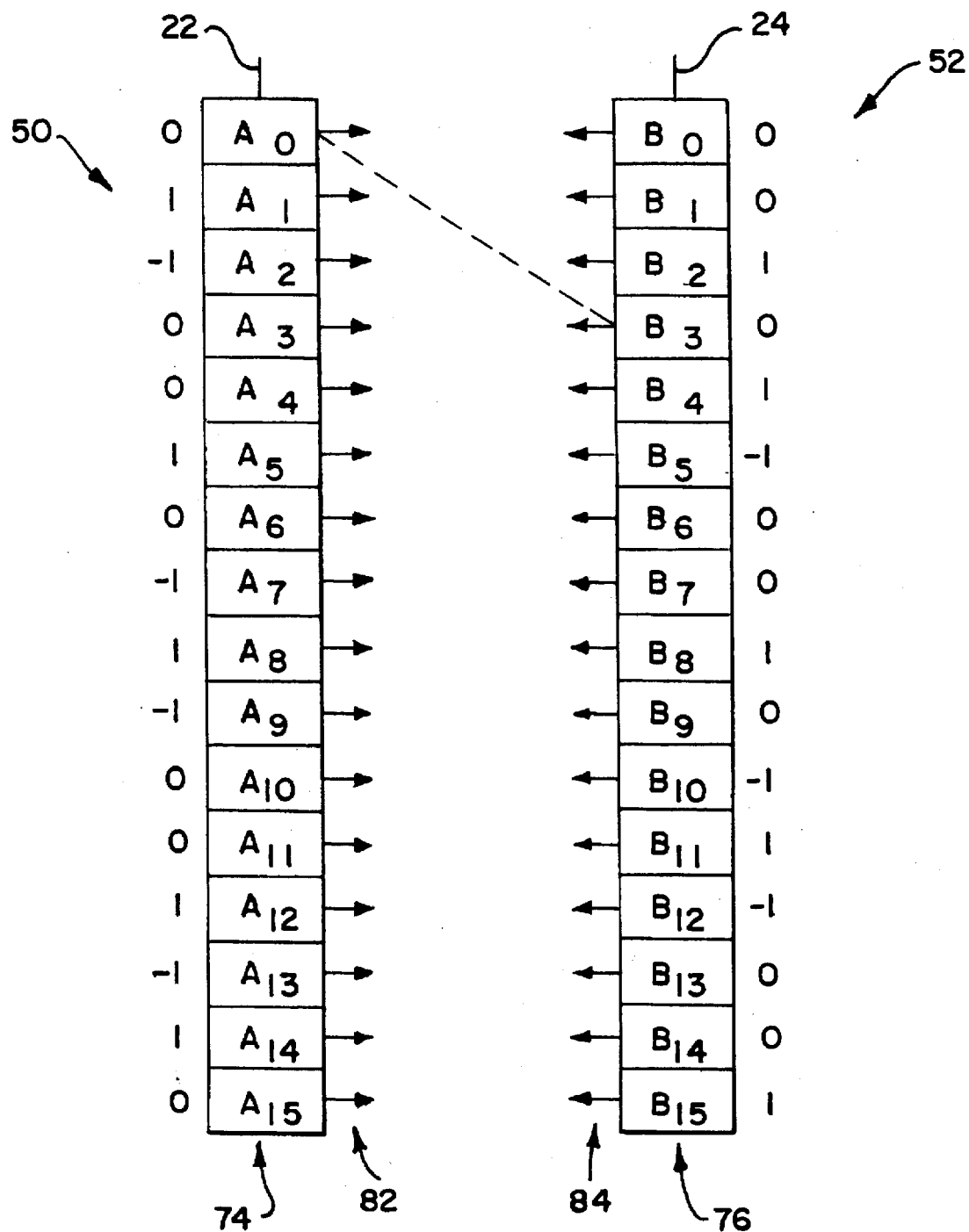
FIG. 6 is a diagram showing a correlation between the exemplary data bits in the cells of the shift registers shown in FIG. 5.

In the example shown in FIG. 6, cell $A_0$ correlates with cell $B_3$. No bi-polar violations are found in the cells shown in FIG. 5. Assume for purposes of illustration, however, that the "A" shift register or buffer (which can, of course, represent either the first or second build-out circuit 50, 52) is providing data to the receiving station 42 and its data sequence includes two positive bits immediately following one another (without an intermediate negative bit). Assume also that the correlated bit in the "B" shift register or buffer is zero or negative (so there is no coding error). We may then say that the "B" buffer (or build-out circuit) is the particular shift register that contains the particular correlated bit that correctly follows the coding rule.

Upon detection along the "A" buffer of two positive bits without an intervening negative bit, two negative bits without an intervening positive bit, or 16 consecutive zero bits, the controller 72 then activates the switch 62 so that data from the "B" buffer are forwarded to the receiving station 42. The conditions will be reversed when the controller 74 detects a coding error in the "B" buffer, but not in the "A" buffer.

An example of the process employed by the controller 72 for determining how to activate the switch 62 is shown below:

If the correlated bit in the A buffer is a violation, but the B bit is not: transmit from the B buffer; increment the count of line code violations for the A transmission line.

If the correlated bit in the B buffer is a violation, but the A bit is not: transmit from the A buffer; increment the count of line code violations for the B transmission line.

If neither of the correlated bits in the A and B buffers is a violation: maintain the state of the switch 62.

If both the A and B correlated bits in the buffers are violations: maintain the state of the switch 62; update the count of line code violations for both the A and B transmission lines.

The processor 94 stores in the memory 96 information regarding instances of coding violations. Thus, the processor 94 may, for example, monitor various one-second intervals for the BER and store the BER rates in the memory 96. Alternatively, the processor 94 may only store information relating to instances of high BERs. The module 78 may be queried, via the transmission lines 22, 24, and then provide the information stored in the memory 96. Also, if the BER on a particular line exceeds a predetermined level, the controller 72 may cause an alarm (not shown) to be activated, so as to alert a technician that an unacceptably high BER exists in a transmission line.

In the more practical preferred embodiment shown in FIG. 7, the protection circuit 20 is interconnected to first and second T1 transmission lines, 102, 104. The protection circuit 20 includes first and second bi-polar to bit streams (2-bit) converters 106, 108 (corresponding, respectively, to the first and second T1 transmission lines), primary and secondary first build-out circuits 110, 112, primary and secondary second build-out circuits 114, 116, primary and secondary first fixed delay circuits 118, 120, primary and secondary second fixed delay circuits 122, 124, a correlator 126, and a ganged switch 128. The circuit 20 may also include, in some specifications, a bit stream (2-bit) to bi-polar converter 130.

The transmission lines 102, 104 interconnected to protection circuit 20 carry bi-polar signals. Such signals carry both the logic level of the signal, as well as the sense, or sign, of the bi-polar signal.

The bi-polar to bit stream converters 106, 108 convert the inputs from the lines 102, 104. The bipolar signal is decoded to two bits per symbol. These two bits convey the logic level of the symbol (0 or 1), as well as the sense or sign of the bi-polar signal.

Thus, for example, a high voltage pulse on a the line 102 can correspond to a high voltage signal provided to the primary first build-out circuit 110. A negative signal on the line 102 may correspond to a high voltage provided to the secondary first build-out circuit 112. A zero signal on a the line 102 may correlate to a zero signal provided to both the primary and secondary build-out circuits 110, 112. The build-out circuits 110–116 accept such signals and provide inputs to the correlator 126.

The correlator 126 determines which pair of cells associated with the first line 102 and first build-out circuits 110, 112 correlate to which pair of cells associated with the second line 104 and second build-out circuits 114, 116. In a lower-cost system, the correlator 126 may comprise, for example, an exclusive OR gate and an output averaging circuit (not shown). If the contents of the two selected pairs of cells from the build-out circuits are the same and the contents are fed to an exclusive OR gate, the exclusive OR gate will generate a zero output. Accordingly, if the exclusive OR gate generates a zero output most of the time, the two pairs of cells (from the first build-out circuits 110, 112 and the second build-out circuits 114, 116) may be considered as having correlated bits.

Such an exclusive OR gate may occasionally generate a non-zero output. This may occur, for example, once for every thousand or ten thousand sets of paired bits that are transmitted to it. The output averaging circuit may then compute an average error rate. If the computed average error rate is within an acceptable tolerance, the contents of the two sets of cell pairs may be deemed correlated.

The fixed delay circuits 118–124 shown in FIG. 7 delay two bit streams rather than one. Similarly, the switch 128 is ganged to switch two data streams at the same time. Thus, the bit streams corresponding to either the first or second lines 102, 104 may be sent to the receiving station 42. The switch 128 is again actuated by a controller (not shown in FIG. 7). The controller assures that both streams are sent to the receiving station 42 from the "best" of the two lines 102, 104. "Best" is used in the sense here of the one line that most recently did not have a coding error while the other line did have a coding error.

In many, but not necessarily all, instances, the protection circuit 20 may also include the bit stream to bi-polar converter 130. The converter 130 transmits signals from the switch 128 to the receiving station 42 or other equipment. The converter 130 may also be considered as including a conditioning circuit, which puts the signal in the form that is required by the receiving station 42. Thus, in some applications, the converter 130 changes the bit streams back to a bi-polar signal. If, however, the protection circuit 20 is located, for example, within the customer premises and the customer equipment utilizes a 2-bit stream rather than a bi-polar data stream, such conditioning by the converter 130 would not be required.

A preferred embodiment of the present invention has been described herein. It is to be understood, however, that changes and modification can be made without departing from the true scope and spirit of the present invention. For example, the build-out circuits 50, 52, delay circuits 54, 56, switch 62, controller 72, and correlator 126 may be discrete components. It must be understood, however, that a plurality of such elements may be incorporated in the same component or implemented, in whole or in part, with software.

Also, coding rule violations for line codes other than Alternate Mark Inversion may be monitored and used for switch activation between the two transmission paths. Some code or rule violations might be, for example, partial response encoding violations or cyclical redundancy check violations. The length of the fixed buffers, of course, should be appropriate for the type of coding rules for which errors are monitored.

It is also important to note that the present invention does not have to be used with T-1 lines or with any type of framed signals. The present invention generally does not need to rely on framing bits or other types of "overhead" to detect errors and activate the switch 62 to prevent incorrect data from reaching the receiving station 42. Rather, the present device utilizes correlated bits and the output of a fixed buffer, such that, once a coding violation is detected, the switch 62 is promptly moved, if appropriate. This reduces the risk that errored data still in the buffer will be transmitted to the receiving station 42.

Also, for example, many of the elements of the present invention may be implemented with a variety of electronic hardware or software. Thus, for example, build-out and delay circuits 50–56, 110–124 need not necessarily be comprised of shift registers. The true scope and spirit of the present invention are defined by the following claims, to be interpreted in light of the foregoing specification.

I claim:

1. A protection system for transmitting selected data bits to a receiving station, said system interconnectable to at least two data transmission lines, each of said lines carrying a series of data bits substantially following a predetermined coding rule, said system comprising in combination:

a bi-polar to bit stream converter interconnected to said transmission lines;

a build-out circuit, interconnected to said converter, for receiving and storing build-out sequences of bit stream data from said transmission lines;

a controller, operatively connected to said build-out circuit, and including a computational module for analyzing said build-out sequences of bit stream data stored in said build-out circuit to correlate a bit from said first transmission line with a bit from said second transmission line and to detect when one particular correlated bit follows said coding rule and a second correlated bit violates said coding rule; and a switch, operatively connected to said build-out circuit and responsive to said controller, for allowing transmission to said receiving station the particular sequence carrying said one particular correlated bit that follows said coding rule.

2. A system as claimed in claim 1 wherein said build-out circuit comprises at least first and second shift registers, each of said shift registers including a sequence of cells for storing one of said build-out sequences of data bits.

3. A system as claimed in claim 2 wherein said build-out circuit further comprises a plurality of taps, associated with said cells, for advising said controller of said sequence of said data bits stored in said cells.

4. A system as claimed in claim 3 further comprising a memory interconnected to said controller and wherein said controller detects coding violations in said series of data bits carried by said transmission lines and stores in said memory indications of said coding violations.

5. A system as claimed in claim 4 wherein said controller may receive an inquiry and responsively provide said indication of said coding violations.

6. A system in claim 3 further comprising
two bi-polar to bit stream converters, each interconnected to one of said data transmission lines and providing a bit stream output;
first and second pairs of build-out circuits, each of said pairs of build-out circuits receiving and storing build-out sequences of bit stream data from one of said converters.

7. A system is claimed in claim 1 further comprising a bit stream to bi-polar converter for accepting an output stream from said switch, converting said output stream to a bi-polar stream, and transmitting the said bi-polar stream to said receiving station.

8. A protection system for transmitting selected data bits to a receiving station, said system interconnectable to at least first and second data transmission lines, each of said lines carrying a series of data bits substantially following a predetermined coding rule, said system comprising, in combination:

a controller;

first and second bi-polar to bit stream converters, interconnected, respectively, to said first and second transmission lines;

first and second pairs of build-out circuits, interconnected, respectively, to said first and second bi-polar to bit stream converters, for receiving and storing build-out sequences of data bits from said transmission lines and advising said controller of said build-out sequences, said controller correlating bits from said first pair of build-out circuits with bits from said second pair of build-out circuits, said controller further detecting when one particular pair of correlated bits follows said coding rule and a second pair of correlated bits violates said coding rule;

first and second pairs of buffer shift registers for receiving and storing buffer sequences of data bits from, respectively, said first and second pairs of build-out circuits, and a particular one of said first and second pairs of buffer shift registers carrying said particular correlated bits that follow said coding rule; and a switch, interconnected to said buffer shift registers and responsive to said controller, for transmitting data bits to said receiving station from said particular pair of buffer shift registers carrying said particular correlated bits that follow said coding rule.

9. A system as claimed in claim 8 wherein said coding rule including an alternate mark inversion requirement and a prohibition against an excess of fifteen consecutive zero signals and wherein each of said buffer shift registers includes at least sixteen cells.

10. A data protection system for providing uninterrupted data transmission to a receiving station by sending a data bit stream following a predetermined coding rule on each of a plurality of data transmission lines, said system comprising in combination:

a plurality of shift registers, each shift register operatively connected to a respective transmission line for receiving and storing a block of bits transmitted on said respective transmission line and having a series of taps with each tap providing a respective bit in said block of bits;

a correlator, operatively connected to said plurality of shift registers, for determining a respective transmission delay lag for each transmission line by comparing locations of correlated bits within each of said plurality of shift registers; and a delay interface, operatively connected to said correlator and said plurality of transmission lines, for providing a respective delay after each of said plurality of transmission lines by tapping off from a respective correlated tap on said series of taps of said respective shift register for each of said transmission lines, wherein said respective correlated tap is determined from said respective delay lag such that correlated bits from each of said transmission lines leave from said shift registers at substantially same times.

11. A data protection system of claim 10, further comprising in combination:

a selector for selecting one of said plurality of transmission lines on which said receiving station can rely for transmission of said data bit stream.

12. A data protection system of claim 10, further comprising in combination:

a plurality of bipolar to bit stream converters, each converter operatively connected between a respective one of said plurality of data transmission lines and a respective one of said plurality of shift registers for converting a respective signal on said respective data transmission line to a respective 2-bit data stream.

13. A data protection system of claim 10, wherein said correlator includes:

an exclusive OR gate for comparing contents of said shift registers to find said correlated bits.

14. A data protection system for reducing a bit error rate in transmission of a data bit stream following a predetermined coding rule to a receiving station, wherein said data bit stream is transmitted on each of a plurality of data transmission lines, said system comprising in combination:

a plurality of build-out circuits, each build-out circuit operatively connected to a respective transmission line and including a respective shift register for receiving and storing a block of bits transmitted on said respective transmission line and having a series of taps with each tap providing a respective bit in said block of bits;

a correlator, operatively connected to said shift registers, for determining a respective delay lag for each transmission line by comparing locations of correlated bits within each of said plurality of shift registers;

a delay interface, operatively connected to said correlator and said plurality of transmission lines, for providing a respective delay after each of said plurality of transmission lines by tapping off from a respective correlated tap on said series of taps of said respective shift register for each of said transmission lines, wherein said respective correlated tap is determined from said respective delay lag such that said correlated bits from each of said transmission lines leave from said shift registers at substantially same times;

a controller, operatively connected to each of said correlated taps, and including a computational module for continuously determining which of said transmission lines has transmitted a respective sequence of data bits violating said predetermined coding rule, said respective sequence of data bits for each transmission line being received by said controller from said respective correlated tap, and wherein said controller includes:

a transmission line selector for continuously selecting a selected transmission line, as one of said plurality of transmission lines, having a respective sequence of data bits that substantially follows said predetermined coding rule; and a switch, operatively connected to said correlated taps and said transmission line selector, for allowing through only data from a respective correlated tap of said selected transmission line to said receiving station.

15. A data protection system of claim 14 wherein, said computational module further comprises:

buffers for storing respective sequence of data bits from each of said correlated taps;

a processor for determining which respective sequence of data bits of each of said plurality of data transmission lines violates said predetermined coding rule; and a memory unit for storing information regarding instances of coding violations.

16. A data protection system of claim 14, further comprising a transmitter operatively connected to said switch, for transmitting said respective sequence of data bits from said respective correlated tap of said selected transmission line to said receiving station.

17. A data protection system of claim 14, further comprising a plurality of bipolar to bit stream converters, each converter operatively connected between a respective one of said plurality of data transmission lines and a respective one of said at least two build-out circuits for converting a respective signal on said respective data transmission line to a respective 2-bit data stream.

18. A data protection system of claim 14, further comprising a plurality of fixed delay units, each unit operatively connected between a respective one of said plurality of build-out circuits and said switch, for providing a respective fixed predetermined delay from a respective correlated tap, during which said controller and line selector select said selected transmission line.

19. A data protection system of claim 14 wherein, said correlator includes:

an exclusive OR gate for comparing contents of said shift registers to find said correlated bits within each of said shift registers.

20. A method for controlling bit error rates in a data transmission system, the method including the steps of:

A. sending a respective sequence of data bits on each of a plurality of transmission lines, each respective sequence of data bits being coded to follow a predetermined coding rule;

B. storing blocks of bits from said respective sequence of data bits in a respective build-out circuit having a respective shift register for each data transmission line after a predetermined distance of transmission on said transmission lines, said respective shift register having a series of taps with each tap providing a respective bit in said blocks of bits;

C. determining a respective delay lag for each transmission line by comparing locations of correlated bits within each of said plurality of shift registers;

D. providing a respective delay after each of said plurality of transmission lines by tapping off from a respective correlated tap on said series of taps of said respective shift register for each of said transmission lines, wherein said respective correlated tap is determined from said respective delay lag such that correlated bits from each of said transmission lines leave from said shift registers at substantially same times;

E. determining continuously which of said transmission lines has transmitted a respective sequence of data bits violating said predetermined coding rule, said respective sequence of data bits for each transmission line being received by said controller from said respective correlated tap;

F. selecting continuously a selected transmission line, as one of said plurality of transmission lines, having a respective sequence of data bits that substantially follows said predetermined coding rule; and G. switching through only data from a respective correlated tap of said selected transmission line to said receiving station.

21. The method of claim 20, further including the step of:

H. transmitting said respective sequence of data bits from said respective correlated tap of said selected transmission line to said receiving station.

22. The method of claim 20, further including the step of:

I. converting a respective signal on each of said plurality of data transmission lines to a respective 2-bit data stream before the said step of storing.

23. The method of claim 20, further including the step of:

J. delaying by a predetermined fixed delay data bits from each of said correlated taps such that said line selector can select said selected transmission line before said step of switching said data bits.

24. A method for providing uninterrupted data transmission to a receiving station, said method comprising, in combination:

sending a data bit stream according to a predetermined coding rule along a first transmission line and along a second transmission line, said first transmission line being operatively interconnected to a first shift register for holding bits of data transmitted along said first transmission line, and said second transmission line being operatively interconnected to a second shift register for holding bits of data transmitted along said second transmission line, storing a first block of bits transmitted along said first transmission line in said first shift register and staring a second block of bits transmitted along said second transmission line in said second shift register, said first shift register having a series of first taps, each of said first taps providing a respective bit in said first block of bits, and said second shift register having a series of second taps, each of said second taps providing a respective bit in said second block of bits;

determining a delay lag between said first transmission line and said second transmission line by correlating bits in said first and second shift registers and comparing locations of correlated bits between said first shift register and said second shift register; and aligning said bit streams along said first and second transmission lines by tapping off at least one of said bit streams from a tap, said tap being selected based on said delay lag.

25. The method of claim 24, further including in combination the step of:

selecting one of said first and second transmission lines on which said receiving station can rely for transmission of said data bit stream.

26. The method of claim 24, further including in combination the step of:

converting a respective signal on each of said first and second data transmission lines to a respective 2-bit data stream before the said step of storing.

* * * * *